(12) United States Patent
Pan et al.

(10) Patent No.: US 7,897,695 B2
(45) Date of Patent: Mar. 1, 2011

(54) HYDROGENATION OF DIENE-BASED POLYMERS

(75) Inventors: Qinmin Pan, Waterloo (CA); Garry Rempel, Waterloo (CA); Jialong Wu, Kitchener (CA)

(73) Assignee: LANXESS Inc., Sarnia, Ontario (CA)

( * ) Notice: Subject to any disclaimer, the term of this patent is extended or adjusted under 35 U.S.C. 154(b) by 24 days.

(21) Appl. No.: 12/335,927

(22) Filed: Dec. 16, 2008

(65) Prior Publication Data

US 2009/0270562 A1 Oct. 29, 2009

(30) Foreign Application Priority Data

Dec. 17, 2007 (EP) .................... 07123381

(51) Int. Cl.
*C08C 19/02* (2006.01)
*C08F 8/04* (2006.01)
*C08F 236/12* (2006.01)

(52) U.S. Cl. ............. 525/329.1; 525/331.9; 525/338; 525/370

(58) Field of Classification Search ......... 525/329.1, 525/331.9, 338, 370
See application file for complete search history.

(56) References Cited

U.S. PATENT DOCUMENTS

| | | | |
|---|---|---|---|
| 3,454,644 A | 7/1969 | Dewhirst | 260/570.9 |
| 3,700,637 A | 10/1972 | Finch, Jr. | 260/83.3 |
| 4,337,329 A | 6/1982 | Kubo et al. | 525/339 |
| 4,501,685 A | 2/1985 | Thomson et al. | 502/167 |
| 4,510,293 A * | 4/1985 | Kubo et al. | 525/338 |
| 4,853,441 A | 8/1989 | Buding et al. | 525/339 |
| 4,876,314 A | 10/1989 | Hoxmeier et al. | 525/338 |
| 4,892,928 A | 1/1990 | Hoxmeier | 525/338 |
| 4,954,576 A | 9/1990 | Kubo et al. | 525/339 |
| 5,057,581 A | 10/1991 | Rempel et al. | 525/338 |
| 5,164,457 A | 11/1992 | Kubo et al. | 525/338 |
| 5,272,202 A | 12/1993 | Kubo et al. | 524/565 |
| 5,399,632 A | 3/1995 | Costello et al. | 525/339 |
| 5,652,191 A | 7/1997 | Patterson | 502/162 |
| 5,705,571 A | 1/1998 | Tsiang et al. | 525/338 |
| 5,837,158 A | 11/1998 | Shepodd | 252/181.6 |
| 6,020,439 A | 2/2000 | Ko et al. | 525/338 |
| 6,063,307 A | 5/2000 | Shepodd et al. | 252/181.6 |
| 6,110,397 A | 8/2000 | Shepodd et al. | 252/181.6 |
| 6,410,657 B1 | 6/2002 | Ko et al. | 525/338 |
| 6,683,136 B2 | 1/2004 | Guo et al. | 525/329.3 |
| 6,881,797 B2 | 4/2005 | Lin et al. | 525/338 |
| 2003/0088035 A1 | 5/2003 | Guerin et al. | 525/509 |
| 2006/0211826 A1 | 9/2006 | Rempel et al. | 525/329.1 |

FOREIGN PATENT DOCUMENTS

EP 1 702 930 9/2006

OTHER PUBLICATIONS

Gilliom, L., Macromolecules 22 (1989) 662-665.*
Gilliom; Macromolecules, vol. 22, No. 2, 1989, pp. 662-665, "Catalytic Hydrogenation of Polymers In the bulk".
Gilliom and Honnell; Macromolecules, vol. 25, No. 22, 1992, pp. 6066-6068 "Observation of a Reaction Front in the Bulk Catalytic Hydrogenation of a Polyolefin".
Journal of Polymer Science, Part A, Polymer Chemistry, vol. 30, No. 3, 1992, pp. 471-484, "Preparation of Hydrogenated Nitrile Rubber Using Palladium Acetate Catalyst: Its Characterization and Kinetics".

* cited by examiner

*Primary Examiner*—Roberto Rabago
(74) *Attorney, Agent, or Firm*—Jennifer R. Seng

(57) ABSTRACT

The present invention relates to a process for the selective hydrogenation of the carbon-carbon double bonds in diene-based polymers in bulk form by treatment of the polymer with hydrogen in the presence of a platinum group metal containing catalyst and in the absence of any organic solvent.

10 Claims, No Drawings

HYDROGENATION OF DIENE-BASED POLYMERS

FIELD OF THE INVENTION

The present invention relates to a process for the selective hydrogenation of the carbon-carbon double bonds in diene-based polymers which are present in bulk form in the absence of any organic solvent.

BACKGROUND OF THE INVENTION

It is known that carbon-carbon double bonds in polymers may be successfully hydrogenated by treating the polymer in an organic solution with hydrogen in the presence of a catalyst, as disclosed in U.S. Pat. Nos. 6,881,797, 6,683,136, 6,410,657, 6,020,439, 5,705,571, 5,057,581 and 3,454,644. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and palladium. The suitability of the catalyst depends on the extent of hydrogenation required, the rate of the hydrogenation reaction and the presence or absence of other groups, such as carboxyl and nitrile groups, in the polymers. As a characteristic, such hydrogenation processes always require the use of a large amount of organic solvent to dissolve the polymers to be hydrogenated and work at a relatively high temperature (larger than 100° C.), which raises concerns with respect to the production cost and environmental protection.

To eliminate the requirement for a large amount of organic solvents in hydrogenation operation, Laura R. Gilliom (Macromolecules Vol 22, no. 2, 1989, 662-665) and Laura R. Gilliom and Kevin G. Honnell (Macromolecules Vol. 25, no. 22, 1992, 6066-6068) had attempted to realize bulk hydrogenation of polymers using entrapped catalyst ($Rh(PPh_3)_3Cl$ or $[Ir(COD)(PMePh_2)_2]PF_6$). A conversion of about 90 percent was obtained at moderate temperatures and pressures; however, the reaction rate was very slow and the reaction needed five or more than five days to reach a relatively high conversion.

US-2006/0211826 A1 discloses a process for the selective hydrogenation of olefinic unsaturation in polymers and copolymers in bulk form without the addition of any organic solvent in the presence of hydrogen and a rhodium based catalyst. However, such process generally needs to be performed at relatively high temperatures of well above 100° C.

To milden the reaction conditions for the hydrogenation of unsaturated polymers, palladium-based catalysts for the hydrogenation of unsaturated polymer have received extensive attention:

U.S. Pat. No. 5,652,191 describes a catalyst precursor that is useful in the selective hydrogenation of olefinic unsaturation in polymers or copolymers in solution. The precursor comprises a palladium salt that is complexed with a complexing agent selected from the group consisting of organic phosphates, dialkylidene acetone, and tetraalkyl ammonium hydroxides.

U.S. Pat. No. 5,399,632 discloses a process for the hydrogenation of unsaturated homo- and copolymers in the absence of added gaseous hydrogen by contacting the unsaturated polymer with a hydrogen donor compound in the presence of a Group VIII metal catalyst, especially a supported palladium catalyst.

In the Journal of Polymer Science, Part A, Polymer Chemistry Vol 30, no. 3, 1992, 471-484 a homogeneous solution hydrogenation process using palladium acetate as a catalyst is described. A maximum conversion of 96% was reported.

U.S. Pat. No. 5,164,457 teaches a process for selectively hydrogenating a nitrile group-containing unsaturated copolymer in solution, in the presence of hydrogen and a palladium complex having a neutral ligand as a hydrogenation catalyst.

U.S. Pat. Nos. 4,892,928 and 4,876,314 disclose a process for selectively hydrogenating the ethylenic unsaturation in a polymer by contacting the polymer solution with hydrogen in the presence of a catalyst prepared by combining one or more palladium carboxylates with one or more aluminum compounds in a suitable solvent.

U.S. Pat. No. 4,510,293 describes a process for catalytically hydrogenating unsaturation of conjugated diene polymers by introducing hydrogen in the solution of said polymer, characterized in that a palladium salt of a carboxylic acid is used as a catalyst.

U.S. Pat. No. 5,272,202 teaches a process for selective hydrogenation of the $C=C$ double bonds of unsaturated polymers in aqueous emulsion with hydrogen in the presence of a palladium compound as a catalyst and in an organic solvent capable of dissolving or swelling the polymer. Such organic solvent was used at a volume ratio of the aqueous emulsion to the organic solvent in a range of from 1:1 to 1:0.05.

U.S. Pat. Nos. 6,110,397, 6,063,307 and 5,837,158 disclose a process for removing hydrogen from the atmosphere within enclosed spaces by using a hydrogen getter. The hydrogen getter comprises organic polymer molecules having carbon-carbon double bounds, and a hydrogenation catalyst consisting of a noble metal catalyst such as palladium or platinum. Such hydrogenation catalyst is mandatorily supported on an inert catalyst support material. The $C=C$ double bonds are hydrogenated which results in a removal of hydrogen. The processes of U.S. Pat. Nos. 6,110,397, 6,063,307 and 5,837,158, however, do not have the aim to provide maximum hydrogenation degrees but a viable way to remove undesired hydrogen traces from the environment.

Other heterogeneous palladium-based catalyst systems are described in U.S. Pat. Nos. 4,954,576, 4,853,441, 4,501,685 and 4,337,329. Each of the catalyst systems described in the said patents relates to a carrier and palladium supported thereon, which is used for the hydrogenation of olefinic unsaturation in diene-based polymers and copolymers, which were dissolved in an organic solvent.

In summary, the research in this area, namely, the hydrogenation of diene-based polymers, has been very successful if the polymers were dissolved in an organic solvent or if the hydrogenation is carried out at a relatively high reaction temperature. The research activities clearly focused on efficient hydrogenation of diene-based polymers in bulk form is so far very limited: In Macromolecules Vol 22, no. 2, 1989, 662-665 and Macromolecules Vol 25, no. 22, 1992, 6066-6068 rhodium and iridium based catalysts were applied, however, the reaction rate was very slow. In US-2006/0211826 A1 rhodium based catalysts were involved, however, relatively high reaction temperatures had to be applied.

The present invention therefore had the object to provide a new and improved process allowing the selective hydrogenation of a diene-based polymer in bulk form with a high degree of hydrogenation within acceptable short reaction time and at mild reaction temperatures.

SUMMARY OF THE INVENTION

The present invention provides a process for selectively hydrogenating carbon-carbon double bonds in a diene-based polymer comprising subjecting a diene-based polymer which is present in bulk form to hydrogenation in the absence of any organic solvent and in the presence of an unsupported platinum-group metal containing catalyst, wherein such platinum group metal is selected from the group consisting of palladium and platinum.

DETAILED DESCRIPTION OF THE INVENTION

The process of the present invention allows a selective hydrogenation of the carbon-carbon double bonds which are present in the diene-based polymers. This means that, for example, the double bonds in aromatic or naphthenic groups are not hydrogenated and double or triple bonds between carbon and other atoms such as nitrogen or oxygen are also not affected.

The feature of using an unsupported platinum group metal containing catalyst in the absence of any organic solvent to hydrogenate an ethylenically unsaturated polymer which is present in bulk form is important for the successful performance of the process pursuant to the present invention.

Using such novel process a high degree of hydrogenation is achieved, the rate of hydrogenation is high and the crosslinking problem occurring in the processes known from prior art is overcome.

The platinum group metal containing hydrogenation catalyst is not supported on an inert carrier, i.e. catalyst support material. This facilitates the inventive process substantially.

The hydrogenation process of the present invention is performed using an unsupported platinum-group metal containing hydrogenation catalyst wherein the platinum group metal is selected from the group consisting of platinum and palladium. In one embodiment of the invention the platinum-group metal containing hydrogenation catalyst is a platinum or palladium salt.

Preferably the process of the present invention is performed using a palladium containing catalyst, more preferably a palladium salt of a carboxylic acid. As carboxylic acid a saturated aliphatic carboxylic acid, an unsaturated aliphatic carboxylic acid or an aromatic carboxylic acid may be used. Preferably acetic acid, formic acid, lauric acid, oleic acid, succinic acid, stearic acid, phthallic acid, propionic acid, and benzoic acid are used.

The catalyst is typically used in small quantities. The amount of palladium or platinum in the catalyst is in the range of from 20 to 25.000 ppm, preferably of from 500 to 10.000 ppm, based on the polymer to be hydrogenated.

Polymers having carbon-carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of not only at least one conjugated diene as monomer (a) but additionally at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further examples of suitable monomers (b) are esters of ethylenically unsaturated mono- or dicarboxylic acids such as acrylic acid, methacrylic acid, maleic acid, fumaric acid and itaconic acid with generally $C_1$-$C_{12}$ alkanols, such as methanol, ethanol, n-propanol, isopropanol, 1-butanol, 2-butanol, isobutanol, tert.-butanol, n-hexanol, 2-ethylhexanol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are $\alpha,\beta$-unsaturated nitriles. It is possible to use any known $\alpha,\beta$-unsaturated nitrile, preferably a ($C_3$-$C_5$) $\alpha,\beta$-unsaturated nitrile such as acrylonitrile, methacrylonitrile, ethacrylonitrile or mixtures thereof. Particular preference is given to acrylonitrile.

A particularly suitable copolymer to be used in the present invention is a nitrile rubber (also abbreviated as "NBR") this being a copolymer of an $\alpha,\beta$-unsaturated nitrile, particularly preferred acrylonitrile, and a conjugated diene, particularly preferred 1,3-butadiene and optionally one or more further copolymerizable monomers, such as $\alpha,\beta$-unsaturated monocarboxylic or dicarboxylic acids, their esters or amides.

As $\alpha,\beta$-unsaturated monocarboxylic or dicarboxylic acids in such nitrile rubbers preference is given to fumaric acid, maleic acid, acrylic acid and methacrylic acid.

As esters of $\alpha,\beta$-unsaturated carboxylic acids in such nitrile rubbers preference is given to using their alkyl esters and alkoxyalkyl esters. Particularly preferred alkyl esters of $\alpha,\beta$-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of $\alpha,\beta$-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

A preferred terpolymer to be used in the present invention is a terpolymer of acrylonitrile, 1,3-butadiene and a third monomer selected from the group consisting of fumaric acid, maleic acid, acrylic acid, methacrylic acid, n-butyl acrylate and tert-butyl acrylate.

In case that the polymer to be subjected to hydrogenation comprises not only repeating units of one or more conjugated dienes, but also repeating units of one or more further copolymerizable monomers, the proportions of conjugated diene (s) and the other copolymerizable monomers may vary within wide ranges:

In case of NBR polymers being used for hydrogenation the proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

In another embodiment of the invention it is possible to use nitrile rubbers which have been subjected to a metathesis reaction in order to decrease their molecular weight. Such metathesis reaction is known in the art and e.g. disclosed in WO-A-02/100905 and WO-A-02/100941.

The nitrile rubbers which may be used pursuant to this invention have a Mooney viscosity (ML 1+4 at 100° C.) in the range of from 3 to 75, preferably 5 to 75, more preferably 20 to 75, even more preferably 25 to 70, and particularly preferred from 30 to 50. The weight average molecular weight $M_w$ lies in the range of from 25.000-500.000, preferably in the range of from 200.000-500.000, more preferably in the range 200.000-400.000. A nitrile rubber having a Mooney viscosity of e.g. about 34 has an intrinsic viscosity, determined in chlorobenzene at 35° C., of about 1.1 dL/g. The nitrile rubbers used also have a polydispersity $PDI=M_w/M_n$, where $M_w$ is the weight average molecular weight and $M_n$ is the number average molecular weight, in the range of from 1.5 to 6.0, preferably of from 1.8 to 6.0, more preferably of from 1.9 to 6.0 and even more preferably in the range of from 2.0 to 4.0. The determination of the Mooney viscosity is carried out in accordance with ASTM standard D 1646.

If a polymer other than a nitrile rubber is used in the present invention which contains repeating units of one or more conjugated dienes and one or more other copolymerizable monomers like e.g. styrene or alpha-methylstyrene the proportion of the conjugated diene(s) is usually from 15 to less than 100% b.w. and the proportion of or of the sum of the copolymerizable monomer(s) is from greater than 0 to 85% b.w. with the proportion of all monomers in each case adding up to 100%. If styrene or alphamethyl styrene are used as other copolymerizable monomers, the proportion of styrene and/or a methyl styrene is preferably from 15 to 60% b.w., while the remainder to 100% b.w. is represented by the conjugated diene(s).

The carbon-carbon double bond containing polymer used in bulk form in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process, as this process directly yields a latex form of the polymer which may be used to realize the contact with the hydrogenation catalyst as described hereinafter.

The hydrogenation of the polymer is undertaken in the absence of any organic solvent, and the polymer is present in bulk form. The use of organic solvents which is conventional in hydrogenation reactions according to the prior art is eliminated, which means no organic solvent is present during the performance of the process pursuant to the present invention. The polymers to be hydrogenated according to the present invention can be used in the form of particles or thin films. There is no restricting requirement for the particle size and shape or the thickness of the films. However, the smaller the particle size or the thinner the film, the quicker the hydrogenation is; and generally the particle size or the thickness of the films is less than 10 mm, preferably less than 3 mm.

The process of the present invention is generally carried out at a temperature in the range of from 0° C. to 100° C., preferably in the range of from 10° C. to 90° C., more preferably in the range of from 15° C. to 70° C. and even more preferably in the range of from 20° C. to 60° C. This means that the process may be carried out at mild conditions.

The hydrogenation process of the present invention is preferably carried out with hydrogen gas at a pressure of from 0.1 to 20 MPa, preferably at a pressure of from 1 to 16 MPa. In one embodiment of the present process said hydrogen gas is essentially pure.

According to the present invention the catalyst can be introduced into the polymer by any possible means, such as impregnation or mechanical mixing, preferably by using a procedure which can result in molecular mixing of the catalyst and polymer.

In one embodiment of the present invention the platinum-group metal containing catalyst is contacted with the polymer to be hydrogenated by adding the catalyst or catalyst solution to a polymer solution and mixing until an efficient distribution and dissolution of the catalyst has taken place. After the dissolution of the catalyst, the solvent is completely removed and either a polymer film or particles are obtained which are then subjected to the inventive hydrogenation. Typically the temperature is controlled to be in a range of from 0° C. to 30° C., preferably in the range of from 0° C. to 10° C., during such mixing and solvent removal operations. In a typical embodiment the sample prepared in this way is not kept for a too long time, depending on the reaction temperature at which the sample will be hydrogenated. Typically the time of sample storage prior to hydrogenation should not be too long, preferably not much longer than about 70 hours at atmospheric conditions, when the subsequent hydrogenation temperature is between 37-50° C., and it should not be much longer than about 20 hours at atmospheric conditions, when the hydrogenation temperature is lower than 37° C. However, if the samples are kept at a lower temperature and/or prevented from contacting oxygen, storage time is no issue at all and the samples can be kept much longer before the hydrogenation is carried out. Due to this sample preparation a direct contact between the hydrogenation catalyst and hydrogen does not take place before the polymer hydrogenation process.

In a further embodiment the platinum-group metal containing catalyst is contacted with the polymer to be hydrogenated by impregnating the polymer particles or a polymer film with the catalyst powder by using a medium, such as an organic solvent or $CO_2$ only for the catalyst powder. Such a medium should not dissolve the polymer and also should be chemically inert to the polymer/catalyst system. The temperature for the impregnation is typically recommended to be lower than 50° C. The time for the impregnation operation could be a few minutes to 10 hours, depending on the particle size or the film thickness and the impregnation temperature as well as the medium used. After the impregnation step, the medium, e.g. the solvent or $CO_2$ is completely released/removed and either a catalyst-impregnated polymer film or particles are obtained which are then subjected to hydrogenation. Again the sample prepared in this way is typically not kept for too long a time, depending on the reaction temperature at which the sample will be hydrogenated. In general this time should not be much longer than about 70 hours, when the hydrogenation temperature is between 37-50° C., and should not be much longer than about 20 hours, when the hydrogenation temperature is lower than 37° C. Also for this sample preparation a direct contact between the hydrogenation catalyst and hydrogen does not take place before the polymer hydrogenation process.

The hydrogenation process of the present invention can be undertaken in a suitable reactor equipped with temperature regulating and agitating means. If desired the carbon carbon double bond containing polymer can be made into particles or films of different sizes by using any possible way, such as using normal cutting tools (scissors or knifes, etc.) or any particle generating process.

During the course of the hydrogenation reaction of the present invention, the hydrogen may be added to the reactor. The reaction time is typically from about one quarter of an hour to about 100 hours, depending on operational conditions.

According to the present invention, when the hydrogenation reaction is complete, to the extent desired, the reaction vessel can be cooled (if applicable) and vented and the hydrogenated polymer is obtained.

Hydrogenated nitrite rubbers obtained pursuant to this invention have a Mooney viscosity (ML 1+4 at 100° C.) in the range of from 6 to 150, preferably in the range of from 25 to 100, more preferably in the range of from 35 to 100, and even more preferred in the range of from 39 to 100 and particulary preferred in the range of from 40 to 100.

The invention is further illustrated but is not intended to be limited by the following examples.

EXAMPLES

The materials used in the hydrogenation reaction are listed in Table 1.

TABLE 1

Specification of the Materials

| Material | Supplier |
|---|---|
| Butadiene-acrylonitrile Copolymer (Krynac ® 3850), containing 62% butadiene and 38% acrylonitrile, Mooney viscosity (ML1 + 4 at 100° C.) = 50. | Lanxess Inc. |
| Palladium(II) acetate (98%) | Aldrich |
| Palladium(II) propionate (99.9%) | Aldrich |
| Hydrogen (99.999%) | Praxair |
| Acetone (ACS grade) | Fisher Scientific |
| Methyl ethyl ketone (99.8%) | Fisher Scientific |

Reference Example 1

15 g of the above mentioned butadiene-acrylonitrile copolymer solution (4% by weight in acetone) was put in a flask with an arm which can be connected to a vacuum system. The flask was immersed in an ice-water bath. 0.012 g of palladium acetate was charged into the flask. After the dissolution of palladium acetate, the solution was dried under vacuum for about 2 hours. After the drying operation, the polymer sample became film-like, and the thickness was about 0.2~2 mm.

The obtained sample was denoted as Sample A and used for the hydrogenation in Examples 1-12.

Reference Example 2

The same conditions and procedures as described in Reference Example 1 were employed, except 0.003 g of palladium acetate was applied.

The obtained sample was denoted as Sample B and used for hydrogenation in Examples 13-21.

Reference Example 3

The same conditions and procedures as described in Reference Example 1 were employed, except 0.01415 g palladium propionate was applied as a catalyst.

The obtained sample was denoted as Sample C and used for hydrogenation in Example 22.

Reference Example 4

The same conditions and procedures as described in Reference Example 1 were employed, except 0.0045 g of palladium acetate was applied.

The obtained sample was denoted as Sample D and used for hydrogenation in Examples 23-26.

Reference Example 5

The same conditions and procedures as described in Reference Example 1 were employed, except 0.006 g of palladium acetate was applied.

The obtained sample was denoted as Sample E and used for hydrogenation in Examples 27-29.

Reference Example 6

The same conditions and procedures as described in Reference Example 1 were employed, except that the 0.02 g of palladium acetate was dissolved in about 3 ml of acetone and the palladium acetate solution was added into the polymer solution.

The obtained sample was denoted as Sample F and used for hydrogenation in Examples 30-31.

Reference Example 7

The same conditions and procedures as described in Reference Example 6 were employed, except that 0.012 g of palladium acetate was applied and during the polymer sample preparation and vacuum dry process, no ice-water bath was used and the flask was kept in the circumstance of room temperature, i.e. 24±2° C.

The obtained sample was denoted as Sample G and used for hydrogenation in Example 32.

Examples 1-12

Sample A

Example 1

A 300 ml glass-lined stainless steel autoclave, equipped with temperature control means, an agitator, a pressure gauge and a hydrogen gas addition port, was used as a reactor. 0.5 g Sample A prepared in Reference Example 1 was put into the reactor and the reactor was degassed with hydrogen gas. At room temperature (24±2° C.), 400 psi (2.7 MPa) of hydrogen pressure was applied for 3.5 hours. Afterwards the pressure was released, and the polymer sample was taken out of the reactor and dissolved in methyl ethyl ketone and the degree of hydrogenation was determined by infra-red analysis. The resultant polymer was dissolved in methyl ethyl ketone and a 56.7% degree of hydrogenation was achieved.

Example 2

The same procedures and conditions as described in Example 1 were employed, except 15.5 hours of reaction time was applied. The resultant polymer was dissolved in methyl ethyl ketone and a 99.4% degree of hydrogenation was achieved.

Example 3

The same procedures and conditions as described in Example 1 were employed, except 100 psi (0.675 MPa) of hydrogen pressure was applied. The resultant polymer was dissolved in methyl ethyl ketone and a 31.9% degree of hydrogenation was achieved.

Example 4

The same procedures and conditions as described in Example 3 were employed, except 8 hours of reaction time was applied. The resultant polymer was dissolved in methyl ethyl ketone and a 72.2% degree of hydrogenation was achieved.

Example 5

The same procedures and conditions as described in Example 3 were employed, except 20 hours of reaction time was applied. The resultant polymer was dissolved in methyl ethyl ketone and a 99.3% degree of hydrogenation was achieved.

Example 6

The same procedures and conditions as described in Example 1 were employed, except 800 psi (5.4 MPa) of hydrogen pressure was applied. The resultant polymer was dissolved in methyl ethyl ketone and an 82.4% degree of hydrogenation was achieved.

Example 7

The same procedures and conditions as described in Example 6 were employed, except 5.5 hours of reaction time was applied. The resultant polymer was dissolved in methyl ethyl ketone and a 99.4% degree of hydrogenation was achieved.

Example 8

The same procedures and conditions as described in Example 1 were employed, except 1400 psi (9.45 MPa) of hydrogen pressure was applied. The resultant polymer was dissolved in methyl ethyl ketone and an 83.8% degree of hydrogenation was achieved.

Example 9

The same procedures and conditions as described in Example 8 were employed, except 1.5 hours of reaction time was applied. The resultant polymer was dissolved in methyl ethyl ketone and a 61.9% degree of hydrogenation was achieved.

Example 10

The same procedures and conditions as described in Example 6 were employed, except 37° C. of reaction temperature was applied. The resultant polymer was dissolved in methyl ethyl ketone and a 99.8% degree of hydrogenation was achieved.

Example 11

The same procedures and conditions as described in Example 10 were employed, except 1.5 hours of reaction time was applied. The resultant polymer was dissolved in methyl ethyl ketone and an 85.2% degree of hydrogenation was achieved.

Example 12

The same procedures and conditions as described in Example 1 were employed, except 51° C. of reaction temperature, 800 psi (5.4 MPa) of hydrogen pressure and 45 minutes of reaction time were applied. The resultant polymer was dissolved in methyl ethyl ketone and a 98.4% degree of hydrogenation was achieved.

Examples 13-21

Sample B

Example 13

The same procedures and conditions as described in Example 12 were employed, except Sample B was applied. The resultant polymer was dissolved in methyl ethyl ketone and an 82.1% degree of hydrogenation was achieved.

Example 14

The same procedures and conditions as described in Example 13 were employed, except 1.5 hours of reaction time was applied. The resultant polymer was dissolved in methyl ethyl ketone and an 89.4% degree of hydrogenation was achieved.

Example 15

The same procedures and conditions as described in Example 13 were employed, except 2.5 hours of reaction time was applied. The resultant polymer was dissolved in methyl ethyl ketone and a 91.4% degree of hydrogenation was achieved.

Example 16

The same procedures and conditions as described in Example 13 were employed, except 3.5 hours of reaction time was applied. The resultant polymer was dissolved in methyl ethyl ketone and a 94.0% degree of hydrogenation was achieved.

Example 17

The same procedures and conditions as described in Example 16 were employed, except 37° C. of reaction temperature was applied. The resultant polymer was dissolved in methyl ethyl ketone and a 84.8% degree of hydrogenation was achieved.

Example 18

The same procedures and conditions as described in Example 17 were employed, except 5.5 hours of reaction time was applied. The resultant polymer was dissolved in methyl ethyl ketone and a 92.7% degree of hydrogenation was achieved.

Example 19

The same procedures and conditions as described in Example 18 were employed, except room temperature (24±2° C.) of reaction temperature and 22 hours of reaction time were applied. The resultant polymer was dissolved in methyl ethyl ketone and a 41.0% degree of hydrogenation was achieved.

Example 20

The same procedures and conditions as described in Example 19 were employed, except 46 hours of reaction time was applied. The resultant polymer was dissolved in methyl ethyl ketone and a 53.2% degree of hydrogenation was achieved.

Example 21

The same procedures and conditions as described in Example 19 were employed, except 70 hours of reaction time was applied. The resultant polymer was dissolved in methyl ethyl ketone and a 74.3% degree of hydrogenation was achieved.

Example 22

Sample C

Example 22

The same procedures and conditions as described in Example 10 were employed, except polymer Sample C and 3 hours of reaction time were applied. The resultant polymer was dissolved in methyl ethyl ketone and a 99.6% degree of hydrogenation was achieved.

Examples 23-26

Sample D

Example 23

The same procedures and conditions as described in Example 11 were employed, except polymer sample D was applied. The resultant polymer was dissolved in methyl ethyl ketone and a 64.3% degree of hydrogenation was achieved.

Example 24

The same procedures and conditions as described in Example 23 were employed, except 2.5 hours of reaction time was applied. The resultant polymer was dissolved in methyl ethyl ketone and an 81.0% degree of hydrogenation was achieved.

Example 25

The same procedures and conditions as described in Example 23 were employed, except 3.5 hours of reaction time was applied. The resultant polymer was dissolved in methyl ethyl ketone and a 90.0% degree of hydrogenation was achieved.

Example 26

The same procedures and conditions as described in Example 23 were employed, except 2.5 hours of reaction time was applied. The resultant polymer was dissolved in methyl ethyl ketone and a 94.5% degree of hydrogenation was achieved.

Examples 27-29

Sample E

Example 27

The same procedures and conditions as described in Example 26 were employed, except polymer sample E and 1.7 hours of reaction time was applied. The resultant polymer was dissolved in methyl ethyl ketone and a 90.7% degree of hydrogenation was achieved.

Example 28

The same procedures and conditions as described in Example 27 were employed, except 2.5 hours of reaction time was applied. The resultant polymer was dissolved in methyl ethyl ketone and a 97.1% degree of hydrogenation was achieved.

Example 29

The same procedures and conditions as described in Example 28 were employed, except 4.0 hours of reaction time was applied. The resultant polymer was dissolved in methyl ethyl ketone and a 98.3% degree of hydrogenation was achieved.

Examples 30-31

Sample F

Example 30

The same procedures and conditions as described in Example 11 were employed, except that polymer sample F and 1.0 hour of reaction time were applied. The resultant polymer was dissolved in methyl ethyl ketone and a 96.7% degree of hydrogenation was achieved.

Example 31

The same procedures and conditions as described in Example 30 were employed, except that 2.0 hours of reaction time was applied. The resultant polymer was dissolved in methyl ethyl ketone and a 98.8% degree of hydrogenation was achieved.

Examples 32

Sample G

Example 32

The same procedures and conditions as described in Example 30 were employed, except that polymer sample G was applied. The resultant polymer was dissolved in methyl ethyl ketone and a 97.0% degree of hydrogenation was achieved.

A summary for the Examples 1 through 32 is given in the following Table 2.

TABLE 2

Summary and Results of Examples 1 through 32

| Example No. | Pd/polymer (ppm) [1] | $P_{H2}$ (psi/MPa) | T [2] (° C.) | t (h) | HD [3] (%) |
|---|---|---|---|---|---|
| 1 | 9481 | 400/2.76 | RT | 3.5 | 56.7 |
| 2 | 9481 | 400/2.76 | RT | 15.5 | 99.4 |
| 3 | 9481 | 100/0.69 | RT | 3.5 | 31.9 |
| 4 | 9481 | 100/0.69 | RT | 8 | 72.2 |
| 5 | 9481 | 100/0.69 | RT | 20 | 99.3 |
| 6 | 9481 | 800/5.52 | RT | 3.5 | 82.4 |
| 7 | 9481 | 800/5.52 | RT | 5.5 | 99.4 |
| 8 | 9481 | 1400/9.65 | RT | 3.5 | 83.8 |
| 9 | 9481 | 1400/9.65 | RT | 1.5 | 61.9 |
| 10 | 9481 | 800/5.52 | 37 | 3.5 | 99.8 |
| 11 | 9481 | 800/5.52 | 37 | 1.5 | 85.2 |
| 12 | 9481 | 800/5.52 | 51 | 0.75 | 98.4 |
| 13 | 2370 | 800/5.52 | 51 | 0.75 | 82.1 |
| 14 | 2370 | 800/5.52 | 51 | 1.5 | 89.4 |
| 15 | 2370 | 800/5.52 | 51 | 2.5 | 91.4 |
| 16 | 2370 | 800/5.52 | 51 | 3.5 | 94.0 |
| 17 | 2370 | 800/5.52 | 37 | 3.5 | 84.8 |
| 18 | 2370 | 800/5.52 | 37 | 5.5 | 92.7 |
| 19 | 2370 | 800/5.52 | RT | 22 | 41.0 |
| 20 | 2370 | 800/5.52 | RT | 46 | 53.2 |
| 21 | 2370 | 800/5.52 | RT | 70 | 74.3 |
| 22 | 9938 | 800/5.52 | 37 | 3 | 99.6 |
| 23 | 3556 | 800/5.52 | 37 | 1.5 | 64.3 |
| 24 | 3556 | 800/5.52 | 37 | 2.5 | 81.0 |
| 25 | 3556 | 800/5.52 | 37 | 3.5 | 90.0 |
| 26 | 3556 | 800/5.52 | 37 | 5.5 | 94.5 |
| 27 | 4741 | 800/5.52 | 37 | 1.7 | 90.7 |
| 28 | 4741 | 800/5.52 | 37 | 2.5 | 97.1 |
| 29 | 4741 | 800/5.52 | 37 | 4.0 | 98.3 |
| 30 | 9481 | 800/5.52 | 37 | 1.0 | 96.7 |
| 31 | 9481 | 800/5.52 | 37 | 2.0 | 98.8 |
| 32 | 9481 | 800/5.52 | 37 | 1.0 | 97.0 |

[1] "Pd/polymer": ppm of palladium metal with respect to polymer. The palladium catalyst used is palladium acetate for Examples 1-21 and 23-32 and palladium propionate for Example 22.
[2] RT: room temperature, i.e. 24 ± 2° C.
[3] HD: hydrogenation degree Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for selectively hydrogenating carbon-carbon double bonds in a nitrile rubber, this being a copolymer of an α,β-unsaturated nitrile and a conjugated diene and optionally at least one further copolymerizable monomer, comprising subjecting the nitrile rubber which is present in bulk form to a hydrogenation in the absence of any organic solvent and in the presence of an unsupported platinum-group metal containing catalyst, wherein the platinum group metal is selected from the group consisting of palladium and platinum, wherein the hydrogenation is carried out at a temperature in the range of from 20 to 60° C.

2. The process according to claim 1, wherein a palladium salt of a carboxylic acid is used as catalyst.

3. The process according to claim 2, wherein a palladium salt of a saturated aliphatic carboxylic acid, an unsaturated aliphatic carboxylic acid or an aromatic carboxylic acid is used.

4. The process according to claim 3, wherein a palladium salt of acetic acid, formic acid, lauric acid, oleic acid, succinic acid, stearic acid, phthallic acid, propionic acid, or benzoic acid is used.

5. The process according to claim 1 wherein the catalyst is used in an amount in the range of from 20 to 25,000 ppm.

6. The process according to claim 5, wherein the catalyst is used in an amount in the range of from 500 to 10,000 ppm, based on the polymer to be hydrogenated.

7. The process according to claim 1, wherein a copolymer of acrylonitrile, 1,3-butadiene and optionally at least one further copolymerizable monomer selected from the group consisting of an α,β-unsaturated monocarboxylic acid, an α,β-unsaturated dicarboxylic acid, an ester and an amide thereof is subjected to hydrogenation.

8. The process according to claim 1, wherein a terpolymer of acrylonitrile, 1,3-butadiene and a third monomer selected from the group consisting of fumaric acid, maleic acid, acrylic acid, methacrylic acid, n-butyl acrylate and tert-butyl acrylate is subjected to hydrogenation.

9. The process according to claim 1, wherein the hydrogenation is carried out at a hydrogen pressure of from 0.1 to 20 MPa.

10. The process according to claim 1, wherein the hydrogenation is carried out at a temperature in the range of from (24+/−2° C.) to 51° C.

* * * * *